United States Patent [19]

Perryman

[11] Patent Number: 4,747,454
[45] Date of Patent: May 31, 1988

[54] EXTERNAL AXIS PARALLEL ALIGNMENT SYSTEM

[76] Inventor: J. Philip Perryman, 6508 S. Villa, Oklahoma City, Okla. 73159

[21] Appl. No.: 862,148

[22] Filed: May 12, 1986

[51] Int. Cl.⁴ .................. E21B 19/16; G01B 11/26
[52] U.S. Cl. .................... 166/380; 166/250; 166/77.5; 175/45; 33/286; 33/227; 356/153
[58] Field of Search .............. 166/66, 77.5, 250, 380; 175/41, 45, 85; 33/286, 227, 228, DIG. 21; 356/153, 138; 248/544, 231, 230, 206.5

[56] References Cited

U.S. PATENT DOCUMENTS

| | | |
|---|---|---|
| 685,455 | 10/1901 | Kinkead . |
| 958,736 | 5/1910 | Ferris . |
| 1,830,345 | 11/1931 | Anderson ............................. 33/286 |
| 1,918,550 | 7/1933 | McLaughlin ........................ 33/286 |
| 2,088,539 | 7/1937 | Stokenbury .......................... 33/72 |
| 2,117,522 | 5/1938 | Straatman ............................ 33/286 |
| 2,136,689 | 11/1938 | Hughes et al. ...................... 33/286 |
| 2,198,836 | 4/1940 | Patton .................................. 33/46 |
| 2,285,281 | 6/1942 | Johnson ............................... 33/286 |
| 2,436,892 | 3/1948 | Hunter ................................. 88/14 |
| 2,636,274 | 4/1953 | Marsh .................................. 33/85 |
| 2,726,058 | 12/1955 | Foltz ................................... 248/231 |
| 2,883,751 | 4/1959 | Page ..................................... 33/46 |
| 3,116,557 | 1/1964 | Trice .................................... 33/46 |
| 3,143,805 | 8/1964 | Clausen ................................ 33/74 |
| 3,335,635 | 8/1967 | Sidler ................................... 88/14 |
| 3,336,673 | 8/1967 | Cerpelli ............................... 248/231 |
| 3,599,336 | 8/1971 | Walsh . |
| 3,631,601 | 1/1972 | McNulty .............................. 33/46 |
| 3,635,565 | 1/1972 | Colson ................................ 356/153 |
| 3,742,581 | 7/1973 | Roodvoets ........................... 29/407 |
| 3,907,435 | 9/1975 | Roodvoets ........................... 33/286 |
| 4,053,239 | 10/1977 | Tolmon ............................... 33/286 |
| 4,252,439 | 2/1981 | Drozella ............................. 356/153 |
| 4,392,744 | 7/1983 | Tatsuhama et al. ................ 356/153 |
| 4,428,122 | 1/1984 | Mann .................................. 33/293 |

FOREIGN PATENT DOCUMENTS

| | | |
|---|---|---|
| 463542 | 10/1971 | Australia . |
| 496541 | 12/1938 | Fed. Rep. of Germany . |
| 902895 | 9/1945 | France . |
| 408551 | 9/1966 | Switzerland . |
| 970100 | 10/1982 | U.S.S.R. . |

Primary Examiner—Stephen J. Novosad
Assistant Examiner—Bruce M. Kisliuk
Attorney, Agent, or Firm—Bill D. McCarthy

[57] ABSTRACT

An external axis parallel alignment sytem is provided for monitoring and adjusting the alignment of conduits employed to form substantially vertically disposed pipe strings prior to joining a conduit to a previously installed conduit so that the conduits are aligned and have a common central axis extending therethrough. The apparatus employed in the alignment of the conduits includes a signal generating unit capable of producing a signal representative of a vertical plumb line of the conduit being joined to a previously installed conduit, and a target element adapted to receive the signal from the signal generating unit. The apparatus further includes support and connecting assemblies for connecting the signal generating unit and target element to the conduits being aligned and joined.

33 Claims, 3 Drawing Sheets

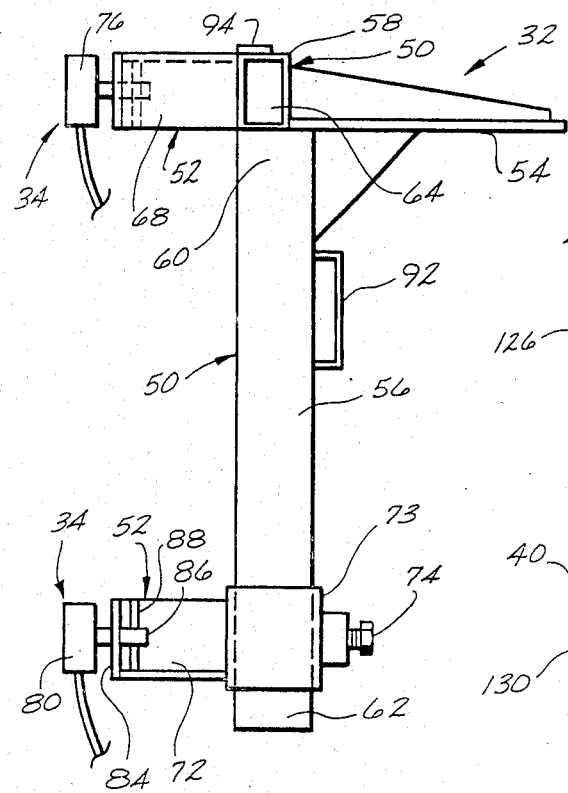
Fig. 7
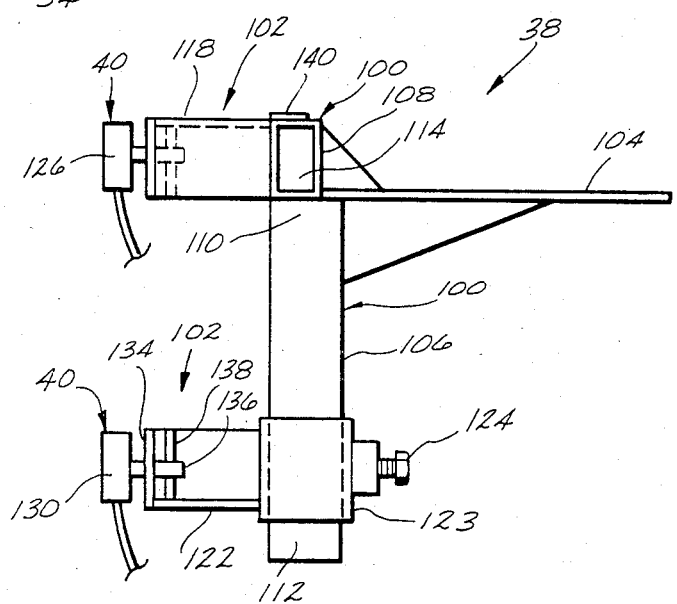
Fig. 8
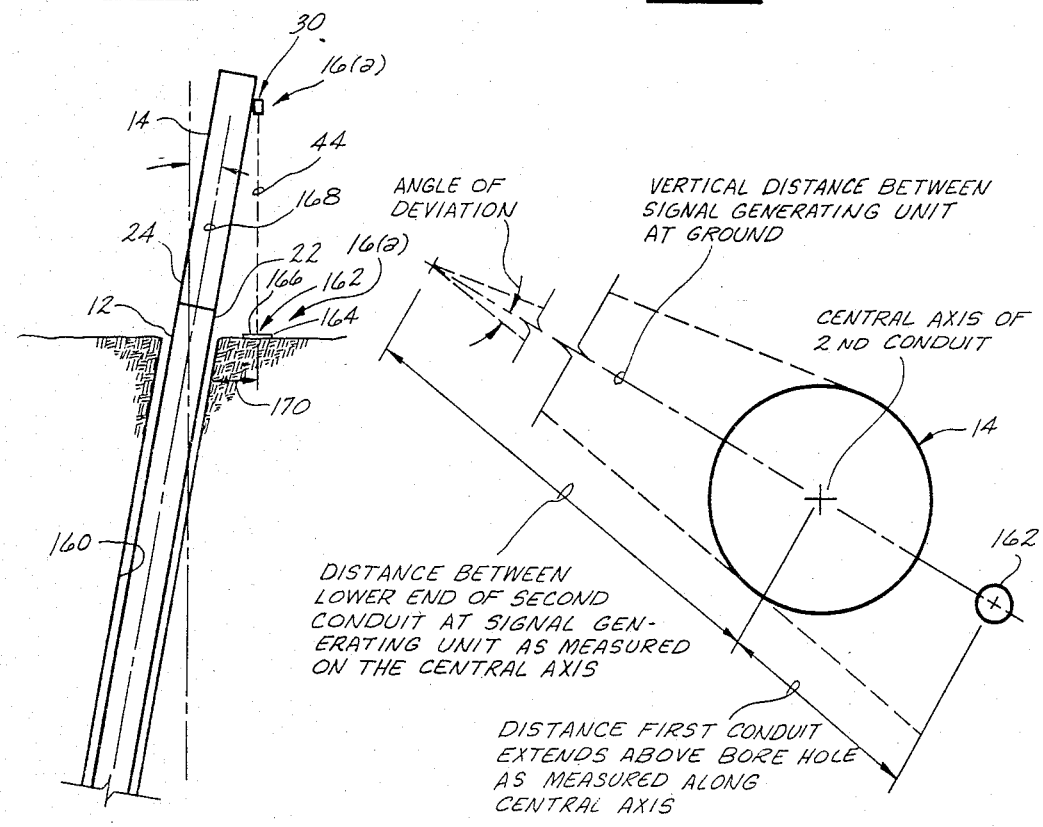
Fig. 9
Fig. 10

4,747,454

EXTERNAL AXIS PARALLEL ALIGNMENT SYSTEM

BACKGROUND OF THE INVENTION

The present invention relates to an external axis parallel alignment system, and more particularly, but not by way of limitation, to a method and apparatus for monitoring and adjusting the substantially vertical alignment of a section of conduit to a previously installed section of conduit so as to align the conduits such that the conduits have a common central axis extending therethrough.

BRIEF DESCRIPTION OF THE PRIOR ART

In the installation of an underground pipe string, such as a pipe string disposed in a vertical shaft (as often encountered in the conventional rotary drilling process) various methods for aligning individual sections of conduit or pipe prior to connecting the sections have heretofore been utilized. For example, one such prior art method for aligning individual sections of the conduit forming the pipe string as the conduits are suspended for attachment has been to use bubble levels and/or straight edges to indicate the relative straightness of the two sections being joined. Often the actual degree of misalignment is not fully interpreted because of the method and equipment used to determine the straightness of the two sections of conduit being joined.

Another procedure often employed requires one or more workers to be hoisted to the upper end of a suspended conduit in order for alignment measurements to be taken. This procedure tends to be not only time consuming because of the repeated hoisting of the worker as each section of conduit is being joined to a previously installed section of conduit, but in addition exposes the workers to an awkward and unsafe working condition.

Because of the prior art methods employed, the straightness of the string of pipe has generally been limited to the existing structure used for the suspension of the individual sections of conduit being joined to form the pipe string, and in particular, whether the suspending element (i.e. blocks, pulleys and the like) are located directly above the center of attachment. Thus, the result is that the underground pipe string varies in straightness in relation to the variables that are encountered at the time of attachment of the various sections of conduit forming the pipe string. Further, because of the uncertainty of the prior art methods, many times no measurements are taken at all to determine the straightness of the pipe string.

A pipe string which deviates in straightness has higher drag values which are encountered during the lowering of the pipe string into a shaft or bore hole, and such pipe string does not utilize the full diameter of the shaft. Thus, a need has long been recognized for an improved, accurate method and apparatus which monitors and controls the degree of straightness of underground pipe fabricated on site by joining a plurality of sections. This is especially desired in certain applications which require rigid tolerances, such as elevator shaft applications, waste disposal shafts, and the like It is to such a method and apparatus for monitoring and controlling the straightness of underground pipe at the time of attachment of the various sections forming the pipe that the subject invention is directed.

SUMMARY OF THE INVENTION

According to the present invention an improved external axis parallel alignment system for substantially vertically disposed pipe strings is provided. More particularly, the present invention provides an improved method and apparatus for aligning a second conduit with a substantially vertically disposed first conduit forming an underground pipe string. The first conduit, which is disposed within a bore hole so that an upper end thereof extends above the bore hole, (such as at the work floor of a rig), is connectable to a lower end of a second conduit. The second conduit is positioned above and aligned with the first conduit prior to connecting the first and second conduits such that the first and second conduits have a substantially centrally disposed common axis.

The apparatus for aligning the second conduit with the first conduit, when the second conduit is substantially vertically disposed, includes a signal generating unit for producing a signal representative of a vertical plumb line of the second conduit when the second conduit is hoisted vertically above the first conduit and disposed in the vertical position; and a target for receiving the signal. The signal generating unit is connected to the second conduit in close proximity to an upper end thereof via a first support assembly and a first connector assembly such that upon activation of the unit a signal representative of the vertical plumb line of the second conduit is directed downwardly in the direction of the target. The target for receiving the signal from the signal generating unit which is representative of the vertical alignment of the second conduit with the first conduit (when the lower end of the second conduit is substantially abutted with the upper end of the first conduit) is conected to one of the first conduit in close proximity to the upper end thereof and the second conduit in close proximity to the lower end thereof via a second support assembly and a second connector assembly such that the target is alignable with the signal generating unit when the first and second conduits are vertically aligned.

In further accordance with the present invention, a method and apparatus is provided for aligning a second conduit with a first conduit disposed within an angularly deviated shaft so that the lower end of the second conduit can be connected to an upper end of the first conduit to provide a pipe string having a common central axis. The apparatus for aligning the second conduit with the first conduit when the first conduit is disposed within an angularly deviated shaft comprises a signal generating assembly for producing a signal representative of a vertical plumb line of the second conduit when the second conduit is in a hoisted position above the first conduit; and a target for receiving the signal. The signal generating unit is connected to the second conduit in close proximity to an upper end thereof via a support assembly and a first connector such that upon activation of the unit the signal is directed downwardly in the direction of the target. The target is positioned a predetermined distance from the bore hole in which the first conduit is partially disposed so that upon the signal striking the target the degree of misalignment or alignment (as the case may be) of the second conduit with the first conduit can readily be determined and the required positioning adjustments made.

An object of the present invention is to provide an apparatus and method for the accurate alignment of adjacent sections of conduit utilized in the formation of a pipe string disposed within a vertical shaft.

Another object of the present invention, while achieving the before stated object, is to provide a method and apparatus for aligning sections of conduit utilized in the formation of a pipe string to provide a pipe string having a substantially common central axis.

Another object of the present invention, while achieving the before stated objects, is to provide a method and apparatus for the alignment of sections of conduit employed in the fabrication of a substantially vertically disposed pipe string which can be employed on conduits of varying diameter, and which is especially desirable for use with large diameter conduits.

Another object of the present invention, while achieving the before stated objects, is to provide a method and apparatus for measuring and controlling the vertical attitude of a suspended section of conduit during and after attachment of the suspended section of conduit to a lower in place section of conduit.

Another object of the present invention, while achieving the before stated objects, is to provide a method and apparatus for the installation of substantially vertically disposed underground conduits in which speed, accuracy and safety during the construction of the underground pipe string are greatly facilitated, and which do not suffer from the disadvantages of the prior art methods and apparatus.

Other objects, advantages and features of the present invention will be apparent to those skilled in the art from the following detailed description when read in conjunction with the drawings and appended claims.

BRIEF DESCRIPTION OF THE DRAWINGS

FIG. 7 is a side elevational view of the first support assembly of FIG. 5 in which the signal generating unit has been removed.

FIG. 8 is a side elevational view of the second support assembly of FIG. 6.

FIG. 9 is a schematic representation of an apparatus for aligning a second conduit with a first conduit of the present invention wherein the first conduit is disposed an angularly deviated shaft.

FIG. 10 is a schematic representation illustrating a method for locating and positioning the target of the apparatus of the present invention a predetermined distance from the bore hole of an angularly deviated shaft so as to be alignable with the signal from the signal generating unit when the first and second conduits are aligned.

DESCRIPTION OF PREFERED EMBODIMENTS

Figure 1:
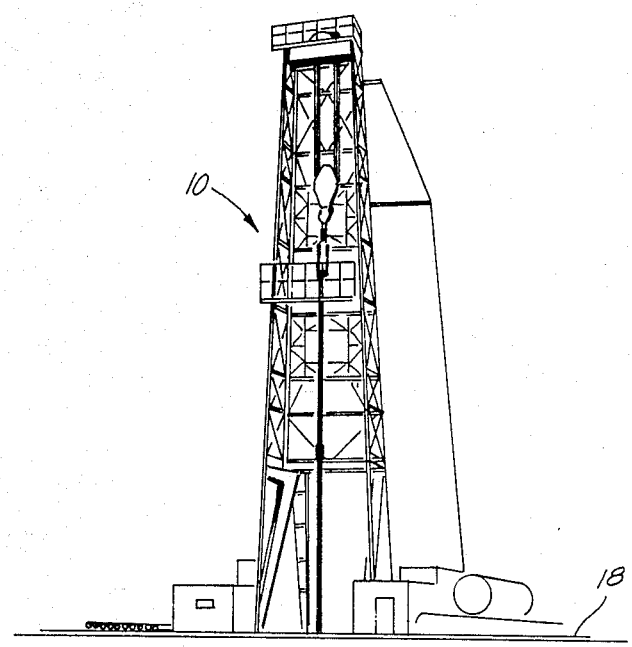
FIG. 1 is an isometric illustration of a rig useful in the drilling of a shaft or bore hole and in the deployment of a pipe string in the shaft.
Figure 2:
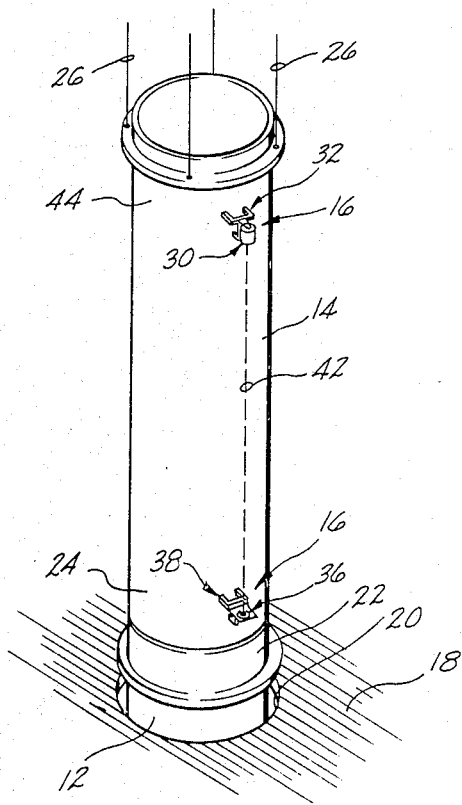
FIG. 2 is an isometric view of a substantially vertically disposed second conduit aligned with a first conduit prior to joining the conduits, and illustrating the apparatus for aligning the second conduit with the first conduit in accordance with the present invention wherein the apparatus is connected to the second conduit.
Figure 3:
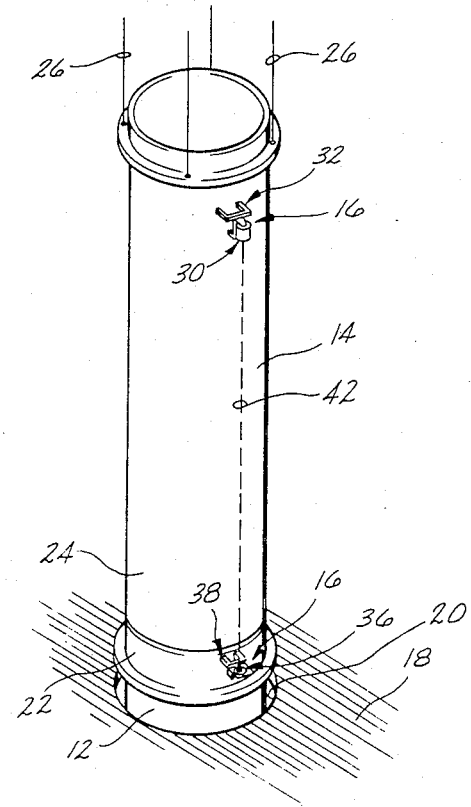
FIG. 3 is an isometric view of a substantially vertically disposed second conduit aligned with a first conduit prior to joining the conduits, and illustrating the apparatus for aligning the second conduit with the first conduit in accordance with the present invention wherein the apparatus is connected to the first and second conduit.
Figure 4:
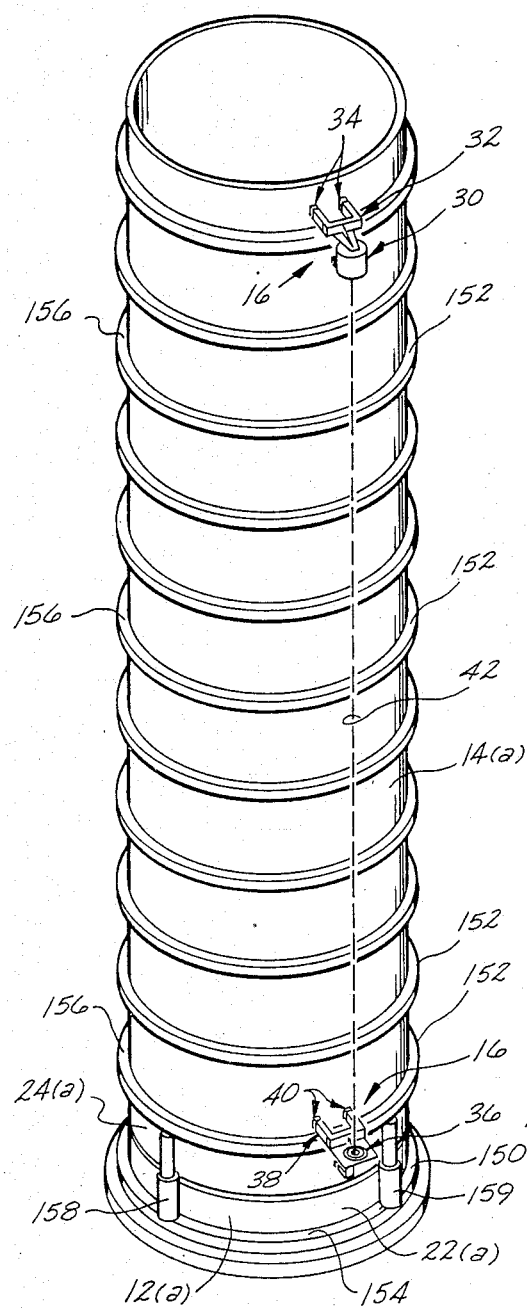
FIG. 4 is an isometric view of a substantially vertically disposed second conduit aligned with a substantially vertically disposed first conduit utilizing the apparatus of the present invention, said conduits having a plurality of externally disposed support or reinforcing ring elements; and further illustrating a plurality of hydraulic ram units positioned between the uppermost support ring of the first conduit and the adjacently disposed lowermost support ring of the second conduit for adjustment of the second conduit with relation to the first conduit.

Referring now to the drawings, and more particularly to FIG. 1, illustrated therein is a typical rig 10 employed in the drilling of a substantially vertically disposed shaft or bore hole and in the deployment of a pipe string in the shaft. The rig 10 can be employed in the practice of the present invention. However, it is to be understood that the rig 10 is only representative of the type of hoisting equipment which can be used to vertically position conduits forming the pipe string such that the alignment of adjacent sections of conduit can be achieved utilizing the apparatus of the present invention. That is, the rig 10 can be employed to position a first conduit 12 within a bore hole or shaft (not shown), and thereafter hoist a second conduit 14 above the first conduit 12 so that the first and second conduits 12, 14 can be aligned utilizing an apparatus 16 of the present invention (substantially as shown in FIGS. 2-4 of the drawings). The rig 10 is provided with a work floor 18 having a support table (not shown) such that when the first conduit 12 is positioned within the shaft a portion of the conduit 12 extends upwardly through the work floor 18 to facilitate the alignment and joining of the first and second conduits 12 and 14.

As previously indicated, rigs, such as rig 10, are well known in the industry and are commonly used in the drilling of a shaft and the insertion of the pipe string into the shaft. Thus, no further comments concerning the rig 10 are deemed necessary to enable one to fully appreciate the invention as herein setforth in more detail.

Referring now to FIGS. 2 and 3, the apparatus 16 utilized in the vertical alignment of the first conduit 12 and the second conduit 14 (prior to connecting said conduits together) so as to form a pipe string having a centrally disposed common axis is illustrated. The first conduit 12 is illustrated as extending upwardly through an opening 20 in the work floor 18 of the rig 10 such that at least a portion (not shown) of the first conduit 12 is disposed within a shaft or bore hole; and an upper end 22 of the first conduit 12 extends upwardly through the opening 20 in the work floor 18 for connection to a lower end 24 of the second conduit 14 once the first and second conduits 12 and 14 have been substantially vertically aligned utilizing the apparatus 16 of the present invention. As illustrated in FIGS. 2 and 3, the second conduit 14 is hoisted utilizing the rig 10 (see FIG. 1) via a plurality of hoist lines 26 so that the second conduit 14 can be positioned directly above the first conduit 12 and the lower end 24 of the second conduit 14 abutted against or disposed substantially adjacent the upper end 22 of the first conduit 12. Further, by utilizing the apparatus 16 of the present invention the first and second conduits 12 and 14 can be substantially vertically aligned prior to connecting the first and second conduits 12, 14; and all adjustments to the alignment of the second conduit 14, as well as making the necessary measurements to determine the alignment of the first and second conduits 12, 14, can be accomplished from the work floor 18 of the rig 10

Referring now to FIGS. 2–6, the apparatus 16 comprises a signal generating unit 30, a first support assembly 32, a first connector assembly 34, a target element 36, a second support assembly 38 and a second connector assembly 40. The signal generating unit 30, upon activation, produces a signal represented by the dashed line 42. The signal generating unit 30 is connected to the second conduit 14 so as to be positioned in close proximity to an upper end 44 of the second conduit 14 substantially as shown. Further, the signal generating unit 30 is connected to the second conduit 14 via the first support assembly 32 and the first connector assembly 34 such that the signal generated by the signal generating unit 30 is directed along the length of the second conduit 14 in the direction of the lower end 24 thereof when the second conduit 14 is disposed in a substantially vertical position. Thus, when the second conduit 14 is substantially vertically disposed the signal represented by the dashed line 42 corresponds to and provides a plumb line reference for the second conduit 14.

On the other hand, the target element 36 which is adapted to receive the signal 42 representative of the vertical plumb line reference of the second conduit 14 from the signal generating unit 30 (when the unit 30 is activated and the second conduit 14 is substantially vertically aligned with the first conduit 12) is connected either to the second conduit 14 so as to be in close proximity to the lower end 24 thereof, as illustrated in FIGS. 2 and 4, or to the first conduit 12 so as to be disposed above the work floor 18 of the rig 10 and in close proximity to the upper end 22 thereof, as illustrated in FIG. 3. Thus, the target element 36, upon receiving the signal 42 from the signal generating unit 30, informs the operator as to the vertical alignment between the first and second conduits 12 and 14, or the degree of misalignment of the second conduit 14 with the first conduit 12 so that adjustments can be made in the positioning of the second conduit 14 to achieve the desired vertical alignment between the first and second conduits 12 and 14. It should be noted that, regardless of whether the target element 36 is connected to the first or second conduits 12, 14 as hereinbefore described, the first support assembly 32 is connected to the second conduit 14 and the second support assembly 38 is connected to the first and/or second conduits 12 and 14 such that the first and second support assemblies 32, 38 are aligned and provided with a common longitudinal axis. Thus, the signal generating unit 30 will be aligned with the target element 36 when the second conduit 14 is positioned above the first conduit 12 such that the lower end 24 of the second conduit 14 substantially abuts the upper end 22 of the first conduit 12, and the second conduit 14 is substantially vertically aligned with the first conduit 12 such that the firs and second conduits 12 and 14 are provided with a common central axis extending therethrough.

Any suitable means capable of generating a signal representative of the vertical plumb line of the second conduit 14 (when same is in a vertically disposed position) which is receivable and detectable by the target element 36 can be employed as the signal generating unit 30 of the present invention. However, desirable results have been obtained where the signal generating unit 30 is a Laser Beacon 5025 manufactured by Laser Alignment, 6330 28th Street S.E., Grand Rapids, Mich.

Figure 5:
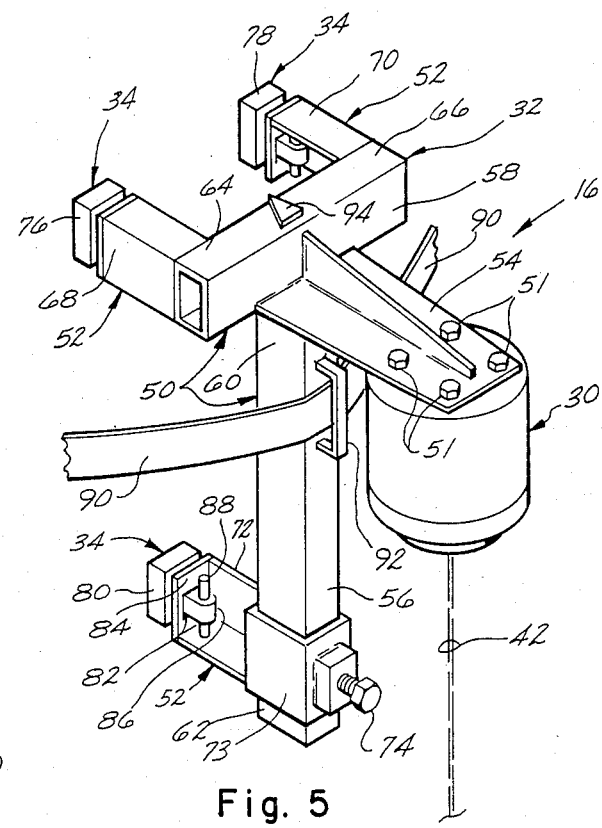
FIG. 5 is an isometric view of a signal generating unit connected to a first support assembly of the apparatus of the present invention.

Referring more specifically to FIGS. 5 and 7, the first support assembly 32 is illustrated in more detail. The first support assembly 32 comprises a frame 50, a leg assembly 52 for positioning the frame 50 in close proximity to the upper end 44 of the second conduit 12 (as shown in FIGS. 2–4) and a plate member 54 for connecting the signal generating unit 30 in a stable position such that the signal generating unit 30, upon activation, emits the signal 42 representative of the vertical plumb line of the second conduit 14 when the second conduit 14 is substantially vertically disposed. Any suitable means can be employed to secure the signal generating unit 30 to the plate member 54 in the desired position, such as a plurality of bolts 51.

The leg assembly 52 is connected to the frame 50 such that the leg assembly 52 extends therefrom in a direction substantially normal to the frame 50; and the plate member 54 is connected to the frame 50 such that the plate member 54 is disposed substantially normal to the frame 50 and extends therefrom in a direction opposite the direction of extension of the leg assembly 52.

The frame 50 of the first support assembly 32 comprises a substantially vertically disposed body member 56 and a cross support member 58. The body member 56 is illustrated as an elongated member having a first end portion 60 and an opposed second end portion 62; and the cross support member 58 (also illustrated as an elongated member) is provided with a first end portion 64 and a second portion 66. The cross support member 58 is connected to the first end portion 60 of the body member 56 such that the body member 56 and the cross support member 58 cooperate to provide the frame 50 with a substantially T-shaped configuration.

The leg assembly 52 of the first support assembly 32 comprises a first leg member 68, a second leg member 70 and a third leg member 72. The first leg member 68 is connected to the first end portion 64 of the cross support member 58 so as to extend therefrom in a direction substantially normal to an elongated axis of the cross support member 58; and the second leg member 70 is connected to the second end portion 66 of the cross support member 58 so as to extend therefrom in a direction substantially normal to the elongated axis of the cross support member 58 and in a substantially parallel, spatial relationship with the first leg member 68. The third leg member 72 is provided with a collar member 73 on one end thereof so that the third leg member 72 can be slideably positionable on the elongated body member 56 of the frame 50 such that the third leg member 72 extends outwardly therefrom in a substantially parallel relationship with a plane of the first and second leg members 68, 70, substantially as shown. The third leg member 72 can be secured on the body member 56 of the frame 50 via the collar member 73 by any suitable means, such as a pin element illustrated by the bolt 74. The first, second and third leg members 68, 70, 72 are of substantially the same length so that upon positioning the leg members against an external side of the second conduit 14, the elongated body member 56 of the frame 50 is disposed substantially parallel to the elongated axis of the second conduit 14.

In order to secure the first support assembly 32 to the upper end 44 of the second conduit 14, the first connector assembly 32 is pivotally connected to the distal end of each of the first leg member 68, the second leg member 70 and the third leg member 72. The pivotal attachment of the first connector assembly 34 to the leg assembly 52 such as the distal end portions of the first leg member 68, the second leg member 70 and the third leg member 72, permits the leg assembly 52 to be attached to conduits having varying diameters, and thus varying circumferences. That is, if the conduit 14 is of small diameter the positioning of the first connector assembly 34 pivotally connected to the distal end portion of the first leg member 68, the second leg member 70 and the third leg member 72 of the leg assembly 52 will be disposed at an angular relationship one with another to compensate for the curvature of the outer surface of the conduit 14. On the other hand, if the conduit 14 has a substantially large diameter the portion of the outer surface against which the first connector assembly 34 is disposed so as to connect the first leg member 68, the second leg member 70 and the third leg member 72 of the leg assembly 52 will be substantially flat, and thus the first connector assembly 32 will be disposed in a substantially parallel plane.

Any suitable means can be employed as the first connector assembly 34 for securing the leg assembly 52 of the first support assembly 32 to the outer surface of the conduit 14. However, when constructing the first support assembly 32 as heretofore described (namely with the first leg member 68, the second leg member 70 and the third leg member 72) desirable results have been obtained wherein a plurality of magnetic elements, such as electro-magnetic elements 76, 78 and 80 are pivotally connected to the distal end portions of the first leg member 68, the second leg member 70 and the third leg member 72, respectively. Any suitable means can be employed to pivotally connect the magnetic elements to the distal end portions of the before mentioned leg members, such as providing a substantially horizontally disposed elongated slot within an end plate on the distal ends of each of the leg members, (such as on elongated slot 82 in an end plate 84 of the third leg member 72 illustrated in FIG. 5) and positioning a tongue portion extending from each of the magnetic elements, (such as tongue portion 86 of magnetic element 80) through the corresponding elongated slots, such as slot 82, and thereafter securing same to the end plate 84 via a pin element, such as pin element 88, positioned through an aperture (not shown) in the tongue portion of the magnetic elements.

Any suitable magnetic elements can be employed having the desired pull to secure the first support assembly 32 to the second conduit 14. However, especially desirable results can be obtained wherein the magnetic elements of the first connector assembly 34, such as the magnetic elements 76, 78 and 80 are electromagnetic elements marketed under the trademark "Bug O" Systems.

To further secure the first support assembly 32 to the second conduit 14 (and thus the signal generating unit 30 to the second conduit 14 in a stable operative position) the first connector assembly 34 further comprises a strap member 90. The strap member 90 is supportable by the body member 56 of the frame 50 and adapted to encircle the second conduit 14 and thus stablize the leg members 68, 70 and 72 of the first support assembly 32 on the second conduit 14. In order to secure the strap member 90 to the first support assembly 32 the body member 56 of the frame 50 of the first support assembly 32 is provided with a substantially U-shaped bracket member 92 disposed a distance below the plate member 54 substantially as shown. The U-shaped bracket member 92 receives the strap member 90 such that the strap member 90 can be positioned around the second conduit 14, drawn taut and secured in a locked position by any suitable means, such as a buckle, not shown.

In order to align the first support assembly 32 with a predetermined mark on the second conduit 14 (such as a top dead center mark scribed on the second conduit 14 in close proximity to the upper end 44 thereof) the first support assembly 32 further comprises an indicator member 94. The indicator member 94 is connected to the cross support member 58 of the frame 50 so as to be substantially centered between the first and second end portions 64, 66 of the cross support member 58. Thus, in attaching the first support assembly 32 to the second conduit 14 the indicator member 94 is aligned with the scribed top dead center mark on the second conduit 14. The importance of the positioning of the first support assembly 32 and the use of the indicator member 94 will become more apparent hereinafter in the discussion of the location and attachment of the second support assembly 38 and thus the location of the target element 36.

Figure 6:
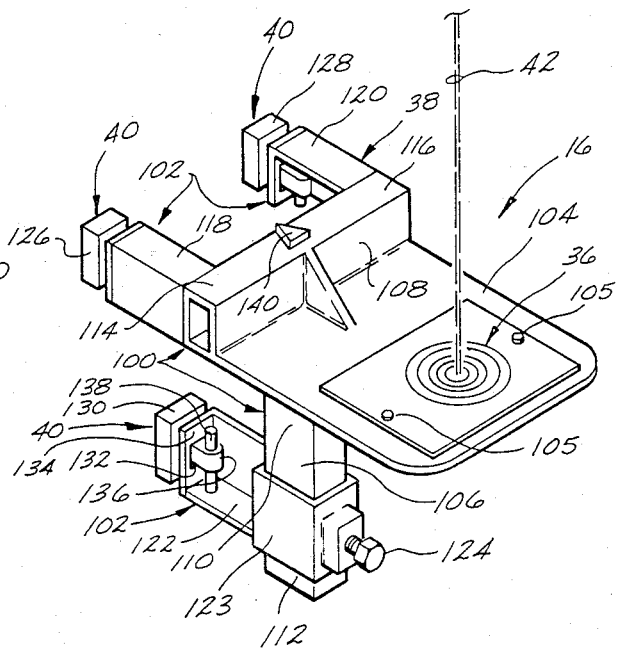
FIG. 6 is an isometric view of a target connected to a second support assembly of the apparatus of the present invention.

Referring now to FIGS. 6 and 8, the second support assembly 38 for securing the target element 36 to one of the first and second conduits 12 and 14 is illustrated in more detail. The second support assembly 38 comprises a frame 100, a leg assembly 102 for positioning the frame 100 on one of the first and second conduits 12, 14 (as shown in FIGS. 2-4), and a plate member 104 for supporting the target element 36 in a stable position. Thus, upon proper positioning of the second support assembly 38, in combination with the vertical disposition of the second conduit 14 in substantial alignment with the first conduit 12, the target element 36 is adapted to receive the signal represented by the dashed lines 42 from the signal generating unit 30 representative of the vertical plumb line of the second conduit 14. Any suitable means can be employed to secure the target element 36 to the plate member 104, such as a plurality of bolts 105.

The target element 36 is provided with a target area, such as a center bulls eye and a plurality of circles of differing diameters disposed about the bulls eye. This enables the operator to readily determine the degree of alignment (or misalignment as the case may be) of the first and second conduits 12 and 14 as hereinbefore described. It should be noted that any suitable means can be employed as the target element 36, and the selection of the type or nature of the target element 36 will be dependent on the type of signals generated by the signal generating unit 30.

The leg assembly 102 is connected to the frame 100 such that the leg assembly 102 extends therefrom in a direction substantially normal to the frame 100; and the plate member 104 is connected to the frame 100 such that the plate member 104 is disposed substantially normal to the frame 100 and extends therefrom in a direction opposite the direction of extension of the leg assembly 102.

The frame 100 of the second support assembly 38 comprises a substantially vertically disposed body member 106 and a cross support member 108. The body member 106 is illustrated as an elongated member having a first end portion 110 and an opposed second end portion 112; and the cross support member 108 (also illustrated as an elongated member) is provided with a first end portion 114 and a second portion 116. The cross support member 108 is connected to the first end portion 110 of the body member 106 such that the body member 106 and the cross support member 108 cooperate to provide the frame 100 with a substantially T-shaped configuration.

The leg assembly 102 of the second support assembly 38 comprises a first leg member 118, a second leg member 120 and a third leg member 122. The first leg member 118 is connected to the first end portion 114 of the cross support member 108 so as to extend therefrom in a direction substantially normal to an elongated axis of the cross support member 108; and the second leg member 120 is connected to the second end portion 116 of the cross support member 108 so as to extend therefrom in a direction substantially normal to the elongated axis of the cross support member 108 and in a substantially parallel, spatial relationship with the first leg member 118. The third leg member 122 is provided with a collar member 123 on one end thereof so that the third leg member 122 can be slideably positionable on the elongated body member 106 of the frame 100 such that the third leg member 122 extends outwardly therefrom in a substantially parallel relationship with a plane of the first and second leg members 118, 120 substantially as shown. The third leg member 122 can be secured on the body member 106 of the frame 100 via the collar member 123 by any suitable means, such as a pin element illustrated by bolt 124. The first, second and third leg members 118, 120, 122 are of substantially the same length so that upon positioning the leg members against an external side of one of the first and second conduits 12, 14, the elongated body member 106 of the frame 100 is disposed substantially parallel to the elongated axis of the conduit to which it is attached.

In order to secure the second support assembly 38 to either the first conduit 12 or the second conduit 14 as hereinbefore discussed, the second connector assembly 40 is pivotally connected to the distal end of each of the first leg member 118, the second leg member 120 and the third leg member 122. The pivotal attachment of the second connector assembly 40 to the leg assembly 102 such as the distal end portions of the first leg member 118, the second leg member 120 and the third leg member 122, permits the leg assembly 102 to be attached to conduits having varying diameters, and thus varying circumferences. That is, if the conduit 14 is of small diameter the positioning of the second connector assembly 40 pivotally connected to the distal end portion of the first leg member 118, the second leg member 120 and the third leg member 122 of the leg assembly 102 will be disposed at an angular relationship one with another to compensate for the curvature of the outer surface of the conduit to which the second support assembly 38 is attached. On the other hand, if the conduit to which the second support assembly 38 is attached has a substantially large diameter the portion of the outer surface against which the second connector assembly 40 is disposed so as to connect the first leg member 118, the second leg member 120 and the third leg member 122 of the leg assembly 102 will be substantially flat, and thus the second connector assembly 40 will be disposed in a substantially parallel plane.

Any suitable means can be employed as the second connector assembly 40 for securing the leg assembly 102 of the second support assembly 38 to the outer surface of the conduit. However, when constructing the second support assembly 38 as heretofore described (namely with the first leg member 118, the second leg member 120 and the third leg member 122) desirable results have been obtained wherein a plurality of magnetic elements, such as electro-magnetic elements 126, 128 and 130 are pivotally connected to the distal end portions of the first leg member 118, the second leg member 120 and the third leg member 122, respectively. Any suitable means can be employed to pivotally connect the magnetic elements to the distal end portions of the before mentioned leg members, such as providing a substantially horizontally disposed elongated slot within an end plate on the distal ends of each of the leg members, (such as on elongated slot 132 in an end plate 134 of the third leg member 122 illustrated in FIG. 6) and positioning a tongue portion extending from each of the magnetic elements, (such as tongue portion 136 of magnetic element 130) through the elongated slots, such as slot 132, and thereafter securing the tongue elements therein via a pin element, such as pin element 138, through an aperture (not shown) in the tongue portion of the magnetic elements.

Any suitable magnetic elements can be employed having the desired pull to secure the second support assembly 38 to one of the first and second conduits 12, 14. However, especially desirable results can be obtained wherein the magnetic elements of the second connector assembly 40, such as the magnetic elements 126, 128 and 130 are electromagnetic elements marketed under the trademark "Bug O" Systems.

In order to align the second support assembly 38 with a predetermined mark on one of the first conduit 12 or the second conduit 14 (such as a top dead center mark scribed on the second conduit 14 in close proximity to the lower end 24 thereof which is vertically aligned with the top dead center mark scribed in close proximity to the upper end 44 of the second conduit 14, or a top dead center mark scribed on the first conduit 12 in close proximity to the upper end 22 thereof) the second support assembly 38 further comprises an indicator member 140. The indicator member 140 is connected to the cross support member 108 of the frame 100 so as to be substantially centered between the first and second end portions 114 and 116 of the cross support member 108. Thus, in attaching the second support assembly 40 to one of the first and second conduits 12, 14, the indicator member 140 is aligned with the scribed top dead center mark on the conduit to which the second support assembly 40 is to be attached. The importance of the positioning of the second support assembly 40 via the indicator member 140 insures that the target element 36 supported by the second support assembly 40 is vertically alignable with the signal generating unit 30 when the second conduit 14 is suspended in a vertical position above the first conduit 12.

Referring now to FIG. 4, the apparatus 16 is utilized in the vertical alignment of conduits as heretofore described is illustrated for aligning conduits of large diameters, such as first conduit 12(a) and second conduit 14(a). The apparatus 16 comprises the signal generating unit 30, the first support assembly 32, the first connector assembly 34, the target element 36, the second support assembly 38 and the second connector assembly 40 has heretofore been described in detail with reference to FIGS. 5-8.

The first conduit 12(a), a large diameter conduit such as those used in the construction of waste disposal pipe strings, is characterized as having an upper end 22(a), a lower end (not shown) and a plurality of externally disposed support and reinforcing ring members 150 (only one being illustrated) for increasing the strength of the first conduit 12(a). Similarly, the second conduit 14(a) is characterized as having a lower end 24(a), an upper end 44(a) and a plurality of externally disposed support and reinforcing ring members 152 for increasing the strength of the second conduit 14(a). The ring members 150 of the first conduit 12(a) are each provided with an upper planar surface, such as surface 154, and a substantially parallel lower planar surface (not shown); and the ring member 152 of the second conduit 14(a) are each provided with an upper planar surface 156 and a substantially parallel lower planar surface (not shown). At least one of the ring members 150 is positioned in close proximity to the upper end 22(a) of the first conduit 12(a); and at least one of the ring members 152 is positioned in close proximity to the lower end 24(a) and the upper end 44(a) of the second conduit 14(a).

When the second conduit 14(a) is substantially vertically disposed above the first conduit 12(a) such that the lower end 24(a) of the second conduit 14(a) abuts the upper end 22(a) of the first conduit 12(a), and a misalignment of the first and second conduits 12(a), 14(a) is detected by the operator by the location of the signal emitted from the signal generating unit 30 on the target element 36, adjustments in the location of the lower end 24(a) of the second conduit 14(a) with respect to the upper end 22(a) of the first conduit 12(a) are required to insure true vertical alignment of the first and second conduits 12(a) and 14(a) prior to joining same together. In order to adjust the vertical alignment of 10 the second conduit 14(a) with relation to the first conduit 12(a) to establish true vertical alignment therebetween it may be necessary to selectively move or elevate a portion of the lower end 24(a) of the second conduit 14(a). The selective movement or elevation of a portion of the lower end 24(a) of the second conduit 14(a) can be achieved by various means. However, one particularly effective method for shifting the lower end 24(a) of the second conduit 14(a) to obtain the desired alignment of the first and second conduits 12(a), 14(a), is through the use of a plurality of hydraulically actuated ram members, only two being shown, namely ram members 158 and 159, equally spaced around the conduit via the upper planar surface 154 of the uppermost ring member 150 of the first conduit 12(a). The hydraulic rams, which are independently operable, can be actuated so as to selectively engage the lower planar surface of the lowermost ring member 152 of the second conduit 14(a) and thereby exert selective lifting forces on the second conduit 14(a) to establish true vertical alignment of the first and second conduits 12(a), 14(a) as indicated by the placement of the signal from the signal generating unit 30 on the target element 36. Once vertical alignment of the first and second conduits 12(a) and 14(a) has been achieved the conduits are connected together by any suitable means, such as welding. Thereafter, the rams are deactivated for removal.

Any suitable hydraulic rams having a capacity to selectively shift the lower end 24(a) of the second conduit 14(a) with relation to the upper end 22(a) of the first conduit 12(a) can be utilized in the practice of the present invention. Typical of such hydraulic rams are those contained in the hydraulic pump and cylinder sets marketed by Enerpac, a division of Allied Power, Inc., Butler, Wis., as model numbers S-177B, S-171B, S-156B and S-178B. Such cylinders are push-type cylinders which are independently operable and exert force in a single direction.

Referring now to FIGS. 9 and 10, an apparatus 16(a) utilized in the alignment of the first conduit 12 and the second conduit 14 (prior to connecting said conduits together) so as to form a pipe string having a centrally disposed common axis is illustrated. A bore hole or shaft 160 into which the conduits, and thus the resulting pipe string, are inserted is an angularly deviated bore hole or shaft, that is, the bore hole 160 is not a vertically disposed bore hole or shaft. The first conduit 12 is illustrated as being disposed in the bore hole 160 such that the upper end 22 of the first conduit 12 is illustrated as being disposed in the bore hole 160 such that the upper end 22 of the first conduit 12 extends upwardly through the opening (not shown) in the work floor (also not shown) of the rig. The second conduit 14 is hoisted above the first conduit such that the lower end 24 of the second conduit can be connected to the upper end 22 of the first conduit once the first and second conduits 12, 14 have been aligned so as to have a common central axis utilizing the apparatus 16(a) of the present invention.

The apparatus 16(a) comprises the signal generating unit 30, the first support assembly 32, the first connector assembly 34 (as hereinbefore described in detail with reference to the apparatus 16 illustrated in FIGS. 5 and 7) and a target element 162. The construction and function of the signal generating unit 30, the first support assembly 32 and the first connector assembly 34 of the apparatus 16(a), as well as their connection to the second conduit 14, are identical to the apparatus 16 hereinbefore described. Thus the description of such elements will not be set forth with reference to Figures 9 and 10, but the discussion of such elements are herein incorporated by reference.

The target element 162 comprises a plate member 164 having a target area on an upper surface 166 thereof adapted to receive a signal, illustrated by the dashed line 42, representative of the plumb line reference of the second conduit 14 from the signal generating unit 30 (when the unit 30 is activated and the first and second conduits 12, 14 are aligned and provided with a common central axis 168).

The target element 162 is positioned on the surface of the ground a predetermined distance 170 from the bore hole 160 so as to be alignable with and adapted to receive the signal 42 transmitted by the signal generating unit 30 when the first and second conduits 12 and 14 are aligned and provided with the common central axis 168. The position or location of the target element 162 will depend on a number of variables, such as the degree and direction of angular deviation of the bore hole 160, the distance that the first conduit 12 extends above the bore hole 160, and the distance between the lower end 24 of the second conduit 14 and the location of the signal generating unit 30 on the second conduit 14.

In order to more clearly explain the position of the target element 162 to insure accurate alignment of the first conduit 12 and the second conduit 14, reference will now be made to FIG. 10. A downhole survey is made on the bore hole 160 using conventional downhole surveying equipment and techniques to determine the degree and direction of deviation of the bore hole 160 from a vertical axis. Once the degree of deviation and direction of deviation of the bore hole 160 is determined, the distance the first conduit 12 extends above the bore hole 160 is determined, and the distance between the lower end 24 of the second conduit 14 and the signal generating unit 30 is determined and the summation of such distances provides the hypotenuse of a 90 degree triangle. Thereafter, the distance between the signal generating unit 30 and the surface of the ground (when the second conduit 14 is hoisted above the first conduit and positioned for connecting thereto is determined. This distance represents one leg of the 90 degree triangle, and the length of this leg of the triangle, coupled with the length of the hypotenuse of the triangle and the angle found between such leg and the hypotenuse enables one to quickly calculate the distance 170 that the target element 162 is positioned from the center line of the bore hole 160. Further, the direction of the placement of the target element 162 is positioned in a southerly direction from the bore hole 160. Once the target element 162 has been properly located, and the second conduit 14 positioned for connection to the first conduit 12, signals emitted by the signal generating unit 30 will be receivable by the target element 162 and indicates any directional adjustments required on the second conduit 12 to establish alignment of the second conduit 14 with the first conduit 12.

In order to more fully describe the apparatus 16 of the present invention, the following procedure for aligning the first conduit 12 and the second conduit 14 in a vertically disposed bore hole or shaft is set forth with reference to FIGS. 1, 2, 4–6 of the drawings.

Prior to installation of the conduits into the bore hole, top dead center points are marked on the O.D. of each conduit in close proximity to each end of the conduit. Any suitable means well known in the art, such as a bubble-type centering tool can be employed to locate and mark the top dead center points of the conduit. Care should be exercised to prevent rotation of the conduits during the marking of the top dead center points to insure vertical alignment of such points. The top dead center points provide reference points for securing the signal generating unit 30 and the target element 36 to the second conduit 14.

After the first conduit 12 has been disposed in the bore hole or shaft (in this case the first conduit of many to be installed) the second conduit 14 is moved to a staging area adjacent to the shaft opening, but near enough to the shaft to allow hoisting equipment of the rig 10 to reach the upper end 44 of the second conduit 14 with lifting tools, such as elevators.

At this time the signal generating unit 30 is attached to the second conduit 14 in close proximity to the upper end 44 thereof via the first support assembly 32 and the first connector assembly 34 by aligning the first support assembly (i.e. the indicator member 94) with the top dead center mark such that the signal generating unit 30 is situated to direct the signal 42 in the direction of the lower end 24 of the second conduit 14.

The second conduit 14 is then lifted to a vertical position by the rig 10; and the second conduit 14 is lowered so that the lower end 24 of the second conduit 14 substantially abuts or is disposed substantially adjacent, the upper end 22 of the first conduit 12. The first and second conduits 12, 14 are then loosely connected to insure that their respective adjacent ends are connected concentric to each other.

The target element 36 is then connected to the second conduit 14 in close proximity to the lower end 24 thereof via the second support assembly 38 and the second connector assembly 40 by aligning the second support assembly 38 (i.e. the indicator member 140) with the top dead center mark such that the target element 36 is situated to receive the signal 42 from the signal generating unit 30 when the second conduit 14 is substantially vertically disposed. Thus, the target element 36 is readily viewable from the work floor 18 of the rig 10 by the operator.

The signal generating unit 30 is activated (i.e. switched to the on position) so as to project a beam downwardly in the direction of the target element 36, the beam representing a true vertical plumb reference for the second conduit 14. The beam or signal produces an illumination dot on any horizontal surface it strikes. Thus, the operator can readily determine the degree of vertical alignment, or misalignment as the case may be, of the second conduit 14. Angular adjustments can then be made to the lower end 24 of the second conduit 14 to establish true vertical alignment of the second conduit 14, as indicated by the projected beam or signal appearing in the bulls eye on the target element 36.

True vertical alignment of the second conduit 14 has now been achieved, and the second conduit 14 can be secured to the first conduit 12 by any suitable means, such as welding. The apparatus 16 provides a means for monitoring the alignment of sections of conduit used in the formation of on site pipe strings, and further provides a means for recording the alignment of each completed section of the pipe string. Upon completion of the vertical alignment an attachment of the conduits, such as the first and second conduits 12, 14, the united sections are lifted to remove elevators and the like that have been employed to hold the sections, and to remove the target element 36 and the associated second support assembly 38 and the second connector assembly 40. The pipe string is thereafter lowered for attachment of another conduit, at which time the signal generating unit 30, and the associated first support assembly 32 and the first connector assembly 34 can be removed and the cycle repeated for installation for another section of conduit.

It is clear that the present invention is well adapted to carry out the objects and attain the ends and advantages mentioned herein as well as those inherent in the invention. While presently preferred embodiments of the invention have been described for purposes of this disclosure, numerous changes may be made which will readily suggest themselves to those skilled in the art and which are accomplished within the spirit of the invention disclosed and as defined in the appended claims.

I claim:

1. An apparatus for vertically aligning a second conduit with a substantially vertically disposed first conduit wherein at least a portion of the first conduit is disposed within a borehole such that a lower end of the second conduit can be connected to an upper end of the first conduit at a work floor of a rig, said apparatus comprising:

signal generating means for producing a signal representative of a vertical plumb line reference when the second conduit is substantially vertically disposed;

first support means for supporting the signal generating means, said first support means connectable to the second conduit in close proximity to an upper end thereof;

first connector means for connecting the first support means to the second conduit;

target means for receiving the signal representative of the vertical plumb line reference from the signal generating means and for indicating the vertical alignment of the second conduit with the first conduit when the lower end of the second conduit is substantially abutted with the upper end of the first conduit;

second support means for supporting said target means, said second support means connectable to the first conduit in close proximity to the upper end thereof, or in the alternative to the second conduit in close proximity to the lower end thereof, so as to be alignable with the first support bracket when the first and second conduits are vertically aligned; and second connector means for connecting the second support means to one of the first and second conduits.

2. The apparatus of claim 1 wherein the first support means comprises:

a frame member;

leg means for connecting the frame member to the second conduit, said leg means being disposed in a direction substantially normal to the frame member; and a plate member connected to the frame member, said plate member being disposed substantially normal to the frame member so as to extend outwardly therefrom in a direction opposite the direction of extension of the leg means, said plate member connectable to the signal generating means for securing the signal generating means in a stable position such that the signal generating means, upon activation, emits a signal representative of the vertical plumb line reference of the second conduit when said second conduit is vertically disposed.

3. The apparatus of claim 2 wherein the frame member of the first support means comprises:

a substantially vertically disposed elongated body member having a first end portion and an opposed second end portion; and a cross support member having a first end portion and a second end portion, the cross support member being connected to the first end portion of the body member such that the body member and the cross support member cooperated to provide the frame member with a substantially T-shaped configuration.

4. The apparatus of claim 3 wherein the leg means comprises:

a first leg member connected to the first end portion of the cross support member so as to extend therefrom in a direction substantially normal to the elongated axis of the cross support member;

a second leg member connected to the second end portion of the cross support member so as to extend therefrom in a direction substantially normal to the elongated axis of the cross support member and in a substantially parallel, spatial relationship with the first leg member; and a third leg member slidable positionable on the elongated body member such that the third leg member extends outwardly therefrom in a substantially parallel relationship with a plane of the first and second leg members.

5. The apparatus of claim 4 wherein the first connecting means comprises:

magnetic elements pivotally connected to distal ends of the first, second and third legs for magnetically connecting the first, second and third legs to the second conduit.

6. The apparatus of claim 5 wherein the first connecting means further comprises:

a strap member supportable by the elongated body member and adapted to encircle the second conduit and stabilize the first, second and third legs in a stable relationship with the second conduit.

7. The apparatus for vertically aligning a second conduit with a substantially vertically disposed first conduit of claim 6 wherein the first support means further comprises:

a U-shaped bracket member connected to the substantially vertically disposed body member of the frame member for receiving a portion of the strap member and connecting the strap member to the body member.

8. The apparatus of claim 7 wherein the first support means further comprises:

an indicator member supported by the cross support member of the frame member at a centering position between the first and second end portions of the cross support member, the indicator member alignable with a top dead center point marked on the surface of the second conduit when the frame member is secured to the second conduit via the magnetic elements and the strap member.

9. The apparatus of claim 8 wherein the signal generating means comprises a light source, said light source emitting a continuous plane of laser light when activated, said light source being connectable to the plate member of the first support means such that the continuous plane of laser light is directable along the second conduit in the direction of the lower end thereof.

10. The apparatus of claim 1 wherein the second support means comprises:

a frame member;

means for connecting the frame member to one of the first and second conduits, said leg means being disposed in a direction substantially normal to the frame member; and a plate member connected to the frame member, said plate member being disposed substantially normal to the frame member so as to extend outwardly therefrom in a direction opposite the direction of extension of the leg means, said plate member connectable to the target means for securing the target means in a stable position such that upon vertical alignment of the first and second conduits the target means receives the signal from the signal generating means and indicates the vertical alignment of the first conduit with the second conduit.

11. The apparatus of claim 10 wherein the frame member of the second support means comprises:

a substantially vertically disposed elongated body member having a first end portion and an opposed second end portion; and a cross support member having a first end portion and a second end portion, the cross support member being connected to the first end portion of the body member such that the body member and the cross support member cooperated to provide the frame member with a substantially T-shaped configuration.

12. The apparatus of claim 11 wherein the leg means of the second support means comprises:

a first leg member connected to the first end portion of the cross support member so as to extend therefrom in a direction substantially normal to the elongated axis of the cross support member;

a second leg member connected to the second end portion of the cross support member so as to extend therefrom in a direction substantially normal to the elongated axis of the cross support member and in a substantially parallel, spatial relationship with the first leg member; and a third leg member slidable positionable on the elongated body member such that the third leg member extends outwardly therefrom in a substantially parallel relationship with a plane of the first and second leg members.

13. The apparatus of claim 12 wherein the second connecting means comprises:

magnetic elements pivotally connected to distal ends of the first, second and third legs of the second support means for magnetically connecting the first, second and third legs to one of the first and second conduits.

14. The apparatus of claim 13 wherein the second support means further comprises:

an indicator member supported by the cross support member of the frame member at a centering position between the first and second end portions of the cross support member, the indicator member alignable with a top dead center point marked on the surface of one of the first and second conduits when the frame member is secured to said conduit via the magnetic elements.

15. The apparatus of claim 14 wherein the target means comprises a target plate having a signal receiving portion on an upper surface therecf, such that upon receiving the signal from the signal generating means the signal receiving portion of the target plate indicates the vertical alignment of the second conduit with the first conduit.

16. The apparatus of claim 1 wherein the second support means is connected to the first conduit in close proximity to the upper end thereof.

17. The apparatus of claim 1 wherein the second support means is connected to the second conduit in close proximity to the lower end thereof.

18. The apparatus of claim 1 wherein the first conduit is provided with a plurality of externally disposed support rings and the second conduit is provided with a plurality of externally disposed support rings, at least one support ring being positioned in close proximity to the lower end of each of the first and second conduits and at least one support ring being positioned in close proximity to the upper end of each of the first and second conduits, each of the support rings having an upper planar surface and a substantially parallel lower planar surface, and wherein the apparatus further comprises:

ram means for selectively engaging the lower end of the second conduit and for altering the position of the second conduit so as to align the second conduit with the first conduit in response to the signal from the signal generating means representative of the vertical plumb line reference of the second conduit on the target means, said rams means positionable upon the upper planar surface of the upper most support ring of the first conduit and engageable with the lower planar surface of the lower most support rings of the second conduit such that upon actuation of the ram means the second conduit can be selectively moved with relation to the upper end of the first conduit.

19. The apparatus of claim 18 wherein the ram means comprises a plurality of independently operable hydraulically actuated rams equally spaced around the first conduit on the upper planar surface of the upper support ring of the first conduit.

20. An appartus for aligning a second conduit with a first conduit disposed within an angularly deviated shaft such that a lower end of the second conduit can be connected to an upper end of the first conduit, the upper end of the first conduit being positioned above ground surface and accessible from a work floor, said apparatus comprising:

signal generating means for producing a signal representative of a vertical plumb line reference for the second conduit;

support means for supporting the signal generating means, the support means connectable to the second conduit in close proximity to an upper end thereof;

connector means for connecting the support means to the second conduit; and target means for receiving the signal from the signal generating means, the target means positionable a predetermined distance from the shaft in which the first conduit is partially disposed so as to be alignable with the signal generating means for receiving the signal therefrom when the upper end of the first conduit substantially abuts the lower end of the second conduit and the first and second conduits are aligned and provided with a common centrally disposed axis.

21. The apparatus of claim 20 wherein the support means comprises:

a frame member;

leg means for connecting the frame member to the second conduit, said leg means being disposed in a direction substantially normal to the frame member; and a plate member connected to the frame member, said plate member being disposed substantially normal to the frame member so as to extend outwardly therefrom in a direction opposite the direction of extension of the leg means, said plate member connectable to the signal generating means for securing the signal generating means in a stable position such that the signal generating means, upon activation, emits a signal representative of the vertical plumb line reference of the second conduit when said second conduit is aligned with the first conduit.

22. The apparatus of claim 21 wherein the frame member of the support means comprises:

a substantially vertically disposed elongated body member having a first end portion and an opposed second end portion; and a cross support member having a first end portion and a second end portion, the cross support member being connected to the first end portion of the body member such that the body member and the cross support member cooperated to provide the frame member with a substantially T-shaped configuration.

23. The apparatus of claims of 22 wherein the leg means comprises:

a first leg member connected to the first end portion of the cross support member so as to extend therefrom in a direction substantially normal to the elongated axis of the cross support member;

a second leg member connected to the second end portion of the cross support member so as to extend therefrom in a direction substantially normal to the elongated axis of the cross support member and in a substantially parallel, spatial relationship with the first leg member; and a third leg member slidable positionable on the elongated body member such that the third leg member extends outwardly therefrom in a substantially parallel relationship with a plane of the first and second leg members.

24. The apparatus of claim 23 wherein the connecting means comprises:

magnetic elements pivotally connected to distal ends of the first, second and third legs for magnetically connecting the first, second and third legs to the second conduit.

25. The apparatus of claim 24 wherein the connecting means further comprises:

a strap member supportable by the elongated body member and adapted to encircle the second conduit and stabilize the first, second and third legs in a stable relationship with the second conduit.

26. The apparatus of claim 25 wherein the support means further comprises:

a U-shaped bracket member connected to the substantially vertically disposed body member of the frame member for receiving a portion of the strap member and connecting the strap member to the body member.

27. The apparatus of claim 26 wherein the support means further comprises:

an indicator member supported by the cross support member of the frame member at a centering position between the first and second end portions of the cross support member, the indicator member alignable with a top dead center point marked of the surface of the second conduit when the frame member is secured to the second conduit via the magnetic elements and the strap member.

28. The apparatus of claim 27 wherein the signal generating means comprises a light source, said light source connectable to the plate member of the support means such that the continuous plane of laser light is directable along the plumb line of the second conduit to said target means when the light source is activated, the second conduit is axially aligned with the first conduit and the lower end of the second conduit substantially abuts the upper end of the first conduit.

29. A method for aligning a second conduit with a first conduit wherein the first conduit is substantially vertically positioned in a bore hole such that an upper end of the first conduit extends upwardly from the bore hole, said second conduit characterized as having an upper end and a lower end, the method comprising the steps of:

connecting a signal generating unit to the second conduit so as to be disposed in close proximity to the upper end thereof, said signal generating means adapted to produce a signal in the direction of the lower end of the second conduit representative of a vertical plumb line reference of the second conduit when the second conduit is substantially vertically disposed;

hoisting the second conduit via the upper end thereof and positioning the second conduit above the first conduit such that the second conduit is substantially vertically disposed and the lower end of the second conduit substantially abuts the upper end of the first conduit;

connecting a target element to the first conduit in close proximity to the upper end thereof, or the alternative to the second conduit in close proximity to the lower end thereof, such that the target element is alignable with the signal generating unit when the second conduit is vertically disposed;

activating the signal generating unit to produce the signal representative of the vertical plumb line reference of the second conduit;

adjusting the position of the second conduit in response to the location of the signal from the signal generating unit on the target element; and connecting the first and second conduits via their respective upper and lower end so as to provide a continuous segment of a pipe string having a substantially vertically disposed common central axis.

30. The method of claim 29 further comprising:

marking a top dead center point on the upper end and the lower end of the first and second conduits prior to hoisting said conduits for placement in the bore hole, said points being reference points for the connection of the signal generating unit and the target element.

31. The method of claim 29 further comprising:

deactivating the signal generating unit;

lifting the continuous segment of the pipe string a selected distance;

removing the target element and hoisting lines;

lowering the segment so that the upper end of the second conduit of the segment extends upwardly from the bore hole; and removing the signal generating unit from the second conduit.

32. A method for aligning a second conduit with a first conduit wherein the first conduit is disposed within an angularly deviated bore hole such that an upper end of the first conduit extends upwardly a distance from the bore hole, said second conduit characterized as having an upper end and a lower end, the method comprising the steps of:

determining the angular deviation of the bore hole;

connecting a signal generating unit to the second conduit so as to be disposed in close proximity to the upper end thereof, said signal generating means adapted to produce a signal representative of a vertical plumb line reference of the second conduit when the second conduit is disposed above the first conduit;

positioning a target element a predetermined distance and direction from the bore hole, said distance and direction being obtained from data obtained in the determination of the angular deviation of the bore hole;

hoisting the second conduit via the upper end thereof so that the lower end of the second conduit substantially abuts the upper end of the first conduit;

activating the signal generating unit to produce the signal representative of the vertical plumb line reference of the second conduit;

adjusting the position of the second conduit in response to the location of the signal from the signal generating unit on the target element; and connecting the first and second conduits via their respectively upper and lower ends so as to provide a continuous segment of a pipe string having a common central axis.

33. The method of claim 32 further comprising:

deactivating the signal generating unit;

lowering the segment into the bore hole such that the upper end of the second conduit of the segment extends upwardly from the bore hole; and removing the signal generating unit from the second conduit.

* * * * *

UNITED STATES PATENT AND TRADEMARK OFFICE
CERTIFICATE OF CORRECTION

PATENT NO. : 4,747,454

DATED : May 31, 1988

INVENTOR(S) : J. Philip Perryman

It is certified that error appears in the above-identified patent and that said Letters Patent is hereby corrected as shown below:

In column 1, line 64, after the word "like" add a period --like.--. In column 5, line 8, after the numeral "10" add a period --10.--. In column 5, line 62, the word "firs" should read --first--. In column 13, line 7, after the word "thereto" add a parenthesis --thereto)--. In column 16, line 7 of claim 7, after the word "apparatus" delete the words --for vertically aligning a second conduit with a substantially vertically disposed first conduit--.

Signed and Sealed this

Sixth Day of December, 1988

Attest:

DONALD J. QUIGG

*Attesting Officer*  *Commissioner of Patents and Trademarks*